United States Patent
Spencer

(10) Patent No.: US 6,253,243 B1
(45) Date of Patent: Jun. 26, 2001

(54) AUTOMATED TRAP CONTROL FOR A DISTRIBUTED NETWORK MANAGEMENT SYSTEM

(75) Inventor: David Scott Spencer, San Fransisco, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/205,869

(22) Filed: Dec. 4, 1998

(51) Int. Cl.[7] .................................................. G06F 15/173
(52) U.S. Cl. ......................... 709/224; 709/223; 709/249; 714/48
(58) Field of Search ..................... 707/10, 104; 709/223, 709/224, 230, 249; 714/47, 48

(56) References Cited

U.S. PATENT DOCUMENTS

| | | |
|---|---|---|
| 5,388,189 | 2/1995 | Kung . |
| 5,473,596 | 12/1995 | Garafola et al. . |
| 5,828,830 | * 10/1998 | Rangaraian et al. .................. 714/48 |
| 6,058,420 | 5/2000 | Davies . |
| 6,167,403 | * 12/2000 | Whitmire et al. ...................... 707/10 |

FOREIGN PATENT DOCUMENTS

| | | |
|---|---|---|
| 398987 | 5/1997 | (EP) . |
| 2254522 | 10/1992 | (GB) . |

OTHER PUBLICATIONS

Koerner, E., "Design of a Proxy for Managing CMIP agents via SNMP", Computer Commuinications 20, pp 349–360, 1997.*

Hunt, R., "Tutorial: SNMP, SNMPv2 and CMIP—the Technologies for Multivendor Network Management", Computer Communications 20, pp 73–88, 1997.*

3com, HP Openview for Windows User Guide for Transcend Management Software, Oct. 1997, Hewlett–Packard Co., pp. 4.17–4.33.

Cisco, Chapter 5: Using Threshold Manager, Cisco Systems Inc., Jan. 1997, pp. 5.1–5.18.

3com, Transcend Enterprise Manager Alarm Management User Guide Version 4.2 for UNIX, 3com Corp., Mar. 1997, pp. 1.1–4.8.

Sun Microsystems, Soltice Enterprise Manager 2.1: A Technical White Paper, Sun Microsystems, Inc., Jan. 1997, pp. 1–63.

* cited by examiner

*Primary Examiner*—Thomas Black
*Assistant Examiner*—John C. Loomis
(74) *Attorney, Agent, or Firm*—Kudirka & Jobse, LLP

(57) ABSTRACT

An SNMP trap daemon in a distributed network management system is enhanced by improving the flexibility of the filtering functions to allow more generality in matching trap information for CMIP conversion and more specificity in determining how traps are forwarded to other managers and mapped to CMIP events. Filtering is added to the trap forwarding mechanism so that specific traps can be routed to specific managers. The format of a mapping file is also modified to allow type conversion and string concatenation of values in the incoming traps. This modification allows improved matching capabilities in CMIP conversion. The format is further modified to allow "wildcard" matching so that a separate entry is not needed for each incoming trap.

23 Claims, 10 Drawing Sheets

AUTOMATED TRAP CONTROL FOR A DISTRIBUTED NETWORK MANAGEMENT SYSTEM

FIELD OF THE INVENTION

This invention relates to network management tools for managing distributed networks and, in particular, to SNMP trap management and distribution.

BACKGROUND OF THE INVENTION

Present day telecommunications and information networks have become larger and far more complex than those which have been available only a few years ago. The trend towards increases in size and complexity can be expected to continue at a high rate into the foreseeable future with the proliferation of cellular networks, the development and deployment of global satellite networks, and the expansion of basic wireline networks in developing nations. Both homogeneous and heterogeneous networks are now being connected together by means of the Internet and other inter-network connection mechanisms.

In order to maintain network reliability and an acceptable quality of service, it is necessary to carefully monitor and manage network resources. However, as existing networks grow larger and more complex, network management also becomes more difficult and more complex. The prior art responded by providing automated management tools for reporting network status. These tools allowed network management personnel to improve the quality of service and maintain high network availability and reliability.

Such automated management tools were distributed and generally arranged as client server applications which provided integrated for supporting heterogeneous network environments. The client portion of the tools was arranged to have a standard interface which minimized variations of look and feel of the system as seen by the network operations personnel whereas the server portion was designed to operate on different platforms. The distributed architecture allowed the tool to evolve and scale as the networks evolved in size, capabilities, and geographies.

One such distributed network management tool is the Solstice Enterprise Manager™ (Solstice EM) network management system which was developed and is marketed by Sun Microsystems, Inc. This tool has an object-oriented and distributed architecture which consists of a plurality of cooperating components, including applications, libraries, information services, databases, and protocols, each of which performs specific tasks. The managed resources are arranged as a plurality of interconnected nodes and "management agents" running in each node gather information about the resources associated with the node. The information is then forwarded back to a management information server (MIS) which interacts with management applications running in other nodes. The MIS can request and change management parameter values, perform requested actions, and receive and evaluate problem reports (e.g. events, such as SNMP traps and CMIP notifications) that the management agents generate.

Although the MIS and the management agents can communicate with each other via various network management protocols such as Simple Network Management Protocol (SNMP), Common Management Information Protocol (CMIP), or other proprietary/legacy protocols, the Solstice EM™ framework interposes software model representations of managed resources in the MIS between management applications and agents of managed resources. The result is that the management applications need not be concerned with management protocol dependencies of the managed resources since the applications only interact with the software model representations in the MIS.

In particular, the management applications direct management tasks in the MIS via a "Portable Management Interface (PMI)" which is a high-level abstraction of an interface for manipulating objects, regardless of their class description, supported protocol, or location. The PMI is also used by the MIS to communicate with the management agents. For example, the MIS can use a management protocol adapter (MPA) to communicate with a management agent. An MPA translates MIS requests to protocol-specific primitives (e.g. CMIP, SNMP, RPC, or other proprietary/ legacy protocol primitives) depending upon the management agent in question. For example, a CMIP MPA communicates with CMIP agents.

One of the most important tasks that a network manager can perform is "alarm" monitoring and management. An alarm is an unsolicited notification called a "trap" in SNMP terminology and an "event" in CMIP terminology which is generated by an agent and sent to the MIS. The notification generally indicates that a particular managed resource associated with the agent has experienced a fault or failure condition or otherwise requires attention. Alarms have an associated severity level which can range from "critical" to "warning."

Network management personnel can manage the alarms by changing their state. For example, a newly generated alarm has an "open" state. Network management personnel can "acknowledge" the alarm indicating that the alarm has been noted. After investigating the problem, the alarm can be "cleared", indicating the problem has been corrected.

Alarm Services is a module in the Solstice EM™ MIS responsible for updating and storing the state of managed objects in the MIS. Alarms arrive at the MIS as event notifications (via an MPA, for example). When such an event is received by the MIS, it is stored in an alarm log as an alarm log record by a Logging Services module and the Alarm Services module is informed about the arrival of this alarm. The Alarm Services module maps each managed-object-based alarm to a corresponding node in a topology database (discussed below) and updates the alarm counters for that topology node based on the alarm severity. The Alarm Services module also keeps the severity synchronized so that it represents the highest (most critical) uncleared alarm log record that is posted against the topology node. The node status is propagated to applications like the Solstice EM™ Viewer and displayed in the appropriate color. The alarm information is also sent to the Solstice EM™ Alarm Manager application for display.

The Solstice EM™ system provides logging services, whereby all network events of interest can be logged in the system. Event logs (also referred to as "logs") maintain a record of the information provided in event notifications. Each log can be configured to select the event notification information that should be recorded in the log. An MIS can contain multiple logs, each containing a different configuration in order to record different types of information (corresponding to different events) in separate logs. Each log is a local managed object. A log contains event log records which mirror information in the event notifications. If a new notification is added to the MIS, a new event log record managed object class that corresponds to the new notification type is also added.

SNMP traps generated by SNMP agents on the network are handled by a Solstice EM™ management system daemon called the "em_snmp-trap" daemon. This daemon is a separate UNIX process which listens on a predetermined network port for incoming SNMP traps which must be forwarded to management stations. The trap daemon forwards the traps to SNMP network managers. The trap daemon also converts incoming SNMP traps to CMIP event notifications which are then sent to the Solstice EM™ management system MIS. Like other EM applications, the em_snmp-trap daemon uses the Portable Management Interface to communicate with the MIS.

The trap daemon's mapping of SNMP traps into CMIP notifications is controlled by entries in a configuration file called a trap mapping file, "trap_maps". The trap_maps file is an ASCII text file that resides in a configuration file directory which the trap daemon reads whenever it starts. The trap daemon can also forward raw SNMP traps to other network managers. The host name and port number of the managers that are to receive the forwarded SNMP traps are held in another configuration file called the "trap_forward" file.

A problem with the SNMP trap daemon is that it is relatively inflexible. For example, the attributes of an incoming SNMP trap must exactly match the attributes stored in the trap_maps file in order for the incoming trap to be properly mapped to a CMIP event. Further, if multiple traps must be mapped to the same CMIP event, a separate record is required in the trap_maps file for each trap. This proliferation of records slows the processing of traps and creates large file sizes. In addition, there is little flexibility in forwarding traps to managers. The traps are forwarded to all managers listed in the trap_forward file regardless of the type of trap.

SUMMARY OF THE INVENTION

The aforementioned drawbacks are addressed in one illustrative embodiment of the invention in which the SNMP trap daemon is enhanced by improving the flexibility of the filtering functions to allow more generality in matching trap information for CMIP conversion and more specificity in determining how traps are forwarded to other managers.

In accordance with one embodiment of the invention, the format of the trap_maps file is modified to allow type conversion and string concatenation of values in the incoming traps. This modification allows improved matching capabilities in CMIP conversion.

In accordance with another embodiment of the invention, the format of the trap_maps file is modified to allow "wildcard" matching so that a separate entry is not needed for each incoming trap.

In accordance with still another embodiment of the invention, filtering is added to the trap forwarding mechanism so that specific traps can be routed to specific managers.

BRIEF DESCRIPTION OF THE DRAWINGS

The above and further advantages of the invention may be better understood by referring to the following description in conjunction with the accompanying drawings in which.

DETAILED DESCRIPTION OF THE PREFERRED EMBODIMENT

Figure 1:
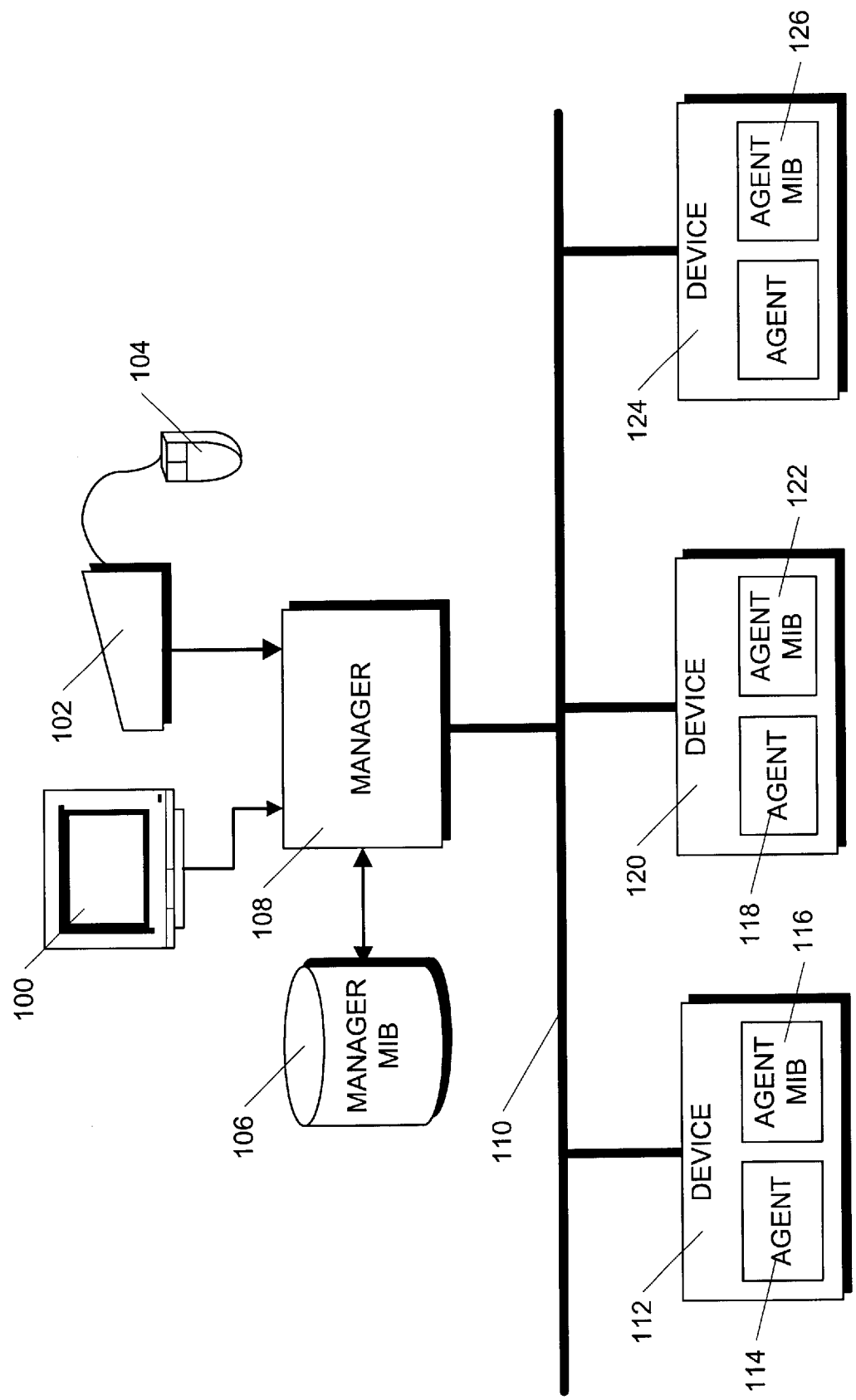
FIG. 1 is a block schematic diagram of a distributed network management system on which the present invention can be operated.

FIG. 1 is a block diagram of a distributed network management system on which an illustrative inventive network management system constructed according to the present invention can run. As shown, the system is a distributed computing environment comprising a plurality of individual computer nodes 108, 112, 120 and 124. The nodes are functionally organized into device nodes 112, 120 and 124 and at least one manager node 108 interconnected over a network 110. However, the device nodes 112, 120 and 124 and manager 108 can also be implemented on a single computer system. The manager node 108, is a conventionally programmed digital computer which includes user interfacing devices, such as a monitor 100, keyboard 102 and mouse 104. In the described embodiment, each node 108 is a network connectable computer, such as a Sun SparcStation™5 workstation running the Solaris™ operating system, a version of the UNIX® operating system, or an IBM-compatible computer running the Windows NT™ operating system. However, use of the systems and processes described and suggested herein are not limited to a particular computer configuration. SparcStation™ and Solaris™ are trademarks of Sun Microsystems, Inc., Mountain View, Calif. UNIX® is a registered trademark of The Open Group, Cambridge, Mass. Windows NT™ is a trademark of Microsoft Corporation, Redmond, Wash. The manager node 108 also includes a database 106, such as a relational database, file system or other organized data storage system which stores management information in a management information database or MIB.

Each device node, 112, 120 and 124, corresponds to a managed device which might for example, be a processor, printer, storage device, network adapter card or other network apparatus. The state of each managed device is monitored and controlled by an agent program running in the node. For example, agent programs 114, 118 and 128 run in nodes 112, 120 and 124, respectively. Each agent may also have a local management information database (116, 122 and 126, respectively) which stores status information and parameters for the managed device.

In operation, a management application program running in the manager node 108 cooperates with the agents 114, 118 and 128 to manage the network. The manager 108 can download information from the agents 114, 118 and 128 or from their associated databases 116, 122 and 126. The manager node 108 can also set parameters in the devices by instructing the agent programs to set parameters and values within the devices or their drivers.

Figure 2:
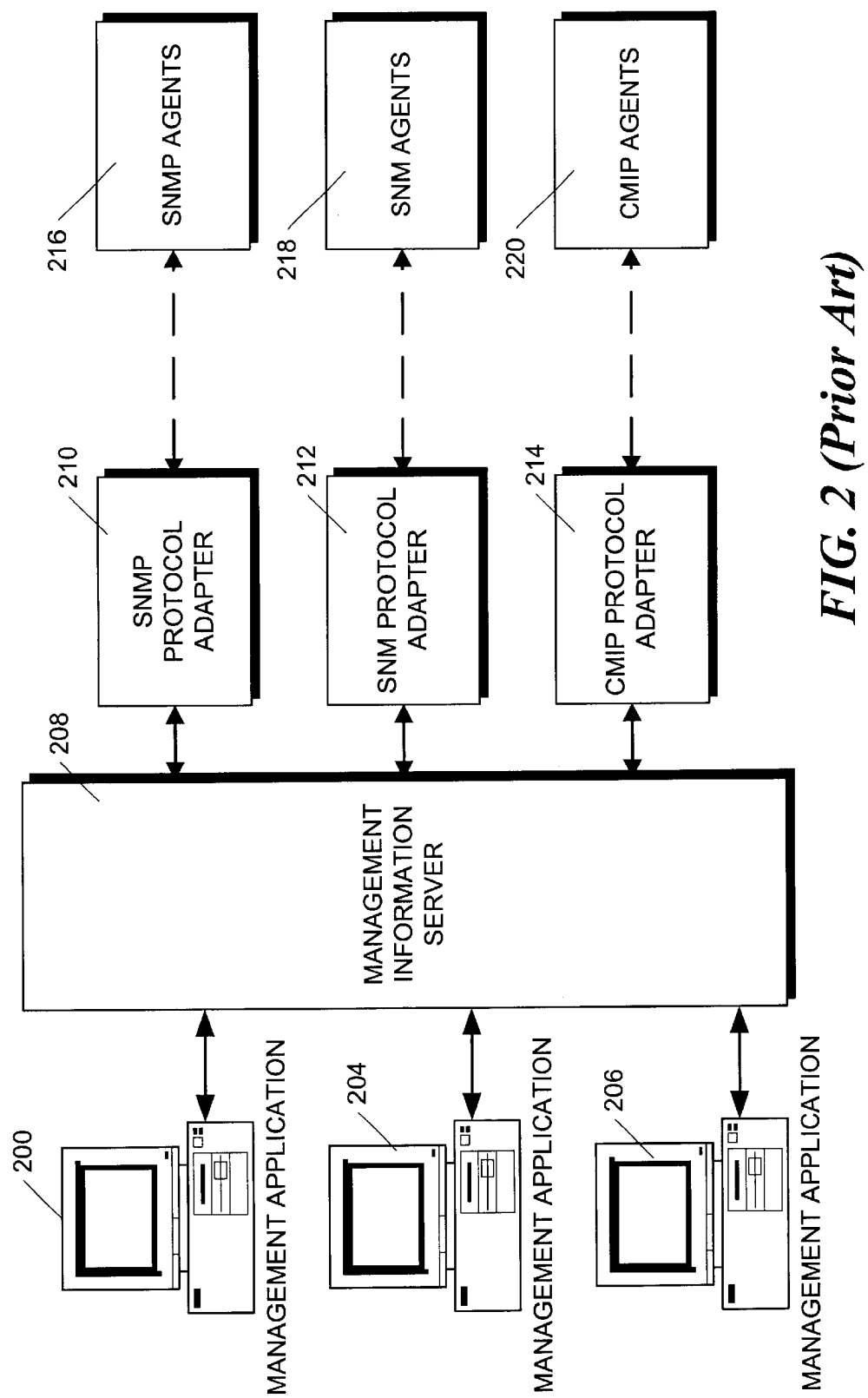
FIG. 2 is a block schematic diagram of a Solstice EM™ distributed network management system on which the present invention can be operated.

In the distributed network management system illustrated in FIG. 1, a single management node 108 is illustrated. This type of system is satisfactory for small networks. However, it does not scale easily because it is difficult to add additional management nodes as the network grows larger. FIG. 2 illustrates a distributed network management system which is designed to be scaleable by using a centralized management information server (MIS) 208. Management information server 208 can provide management information to a number of management applications operating in separate computers 200, 204 and 206, respectively. Alternatively, the management application may operate in one or more computer systems. A system based on this architecture is the Solstice Enterprise Manager™ network management system which is available from Sun Microsystems, Inc., 901 San Antonio Road, Palo Alto, Calif. The remainder of the application will be described in the context of the Solstice EM™ system. However, it will be obvious to those skilled in the art that similar network management systems could be used with the inventive management system without departing from the spirit and scope of the invention. In this system, the management applications are able to access management information located in the management information database that is now sited in the management information server 208.

The management information server 208 interacts with the agents associated with the managed objects 216, 218 and 220, respectively. These agents are typically located remotely in the device nodes and can communicate with the management information server 208 by means of a variety of protocols. In particular, management information server 208 can operate with separate protocols by means of management protocol adapters 210, 212 and 214. For example, management information server 208 can communicate with SNMP agents 216 by means of an SNMP protocol adapter 210. Similarly, management information server 208 can communicate with SunNet manager (SNM) agents 218 by means of an SNM protocol adapter 212. In a like manner, management information server 208 can communicate with CMIP agents 220 by means of a CMIP protocol adapter 214.

The configuration illustrated in FIG. 2 allows separate management applications, such as applications 200, 204 and 206, to share information and operate with a remote database located in the management information server 208. Management information server 208 can, in turn, communicate with a number of local or remote agents 216, 218, and 220 over various network facilities including the internet by means of several different protocols.

Figure 3:
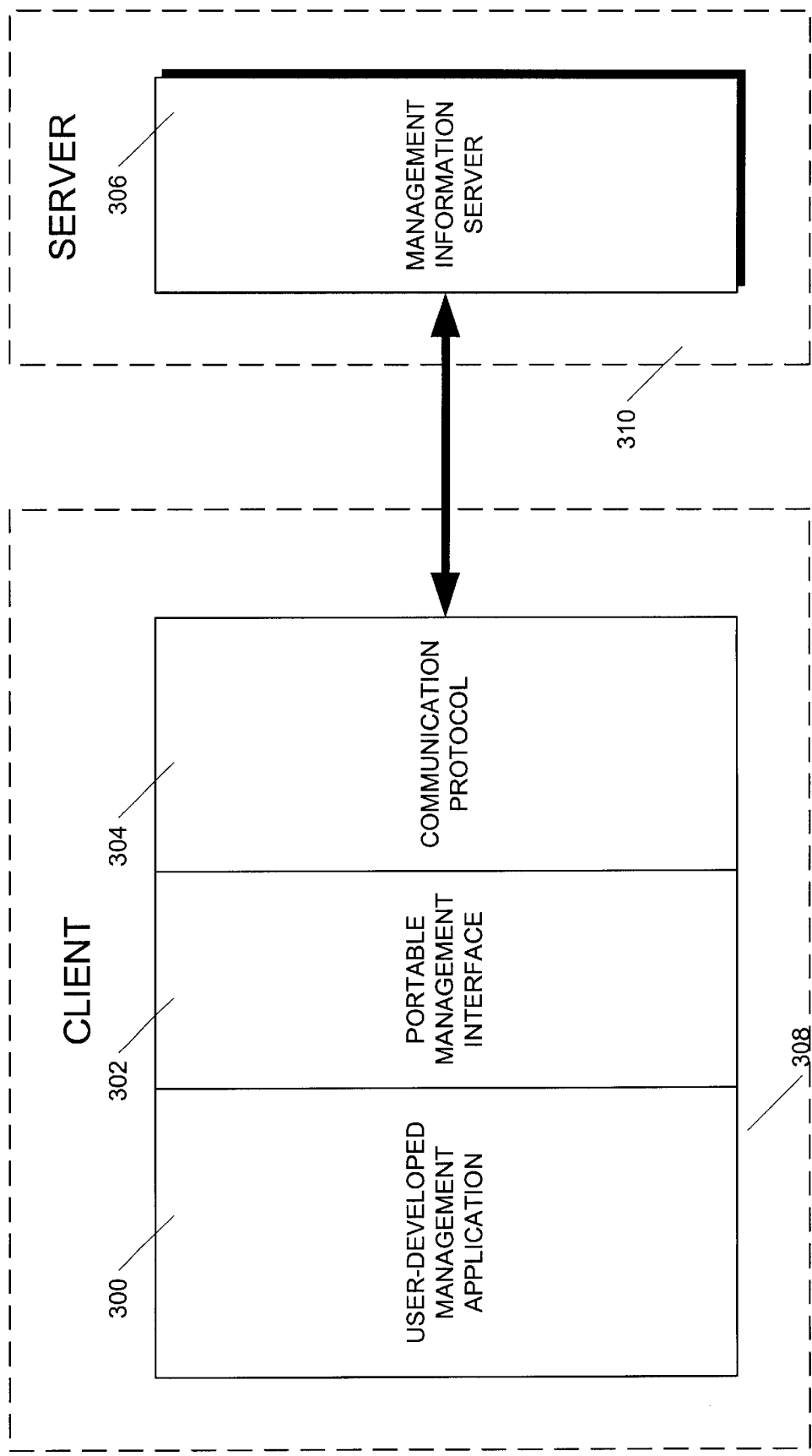
FIG. 3 is a block schematic diagram illustrating the communication between the user-developed management application and the MIS of the Solstice EM™ distributed network management system.

FIG. 3 illustrates, in a more detailed fashion, the manner in which user-developed management application 300 communicates with the MIS server 306. In particular, the user-developed management application 300 which is located in the client node 308 communicates with the management information server 306 located in the server node 310 by means of a portable management interface (PMI) 302. The portable management interface is an object-oriented interface which provides a consistent object-oriented access to the management information. It supports distributed applications that use various management protocols and address transparency. It utilizes a small number of C++ classes and allows for both asynchronous and synchronous applications, event registration for an application and various development services, such as runtime type checking.

The portable management interface 302 connects to the management information server 306 by means of a communication protocol indicated schematically as box 304. This protocol allows the portable management interface to access managed object instance state information stored or managed by the information server 306. It also allows access to managed object class schema stored by the management information server 306 and access to the event services provided by the management information server. The portable management interface 302 also allows managed object instance data to be cached in an application process and provides a simplified syntax for managed objects instance naming.

Events are handled in this system by a callback function registration procedure in which a user-developed management application which desires to obtain notification of an event which occurs in one of the devices, registers with the management information server 306 (by means of the portable management interface 302) an interest in the particular event. The application then acts as a "listener" for the event. When the event occurs, the management information server 306 calls all of the interested listeners. An object in the portable management interface 302 then handles the event call by forwarding it to the user-developed management application 300.

Figure 4:
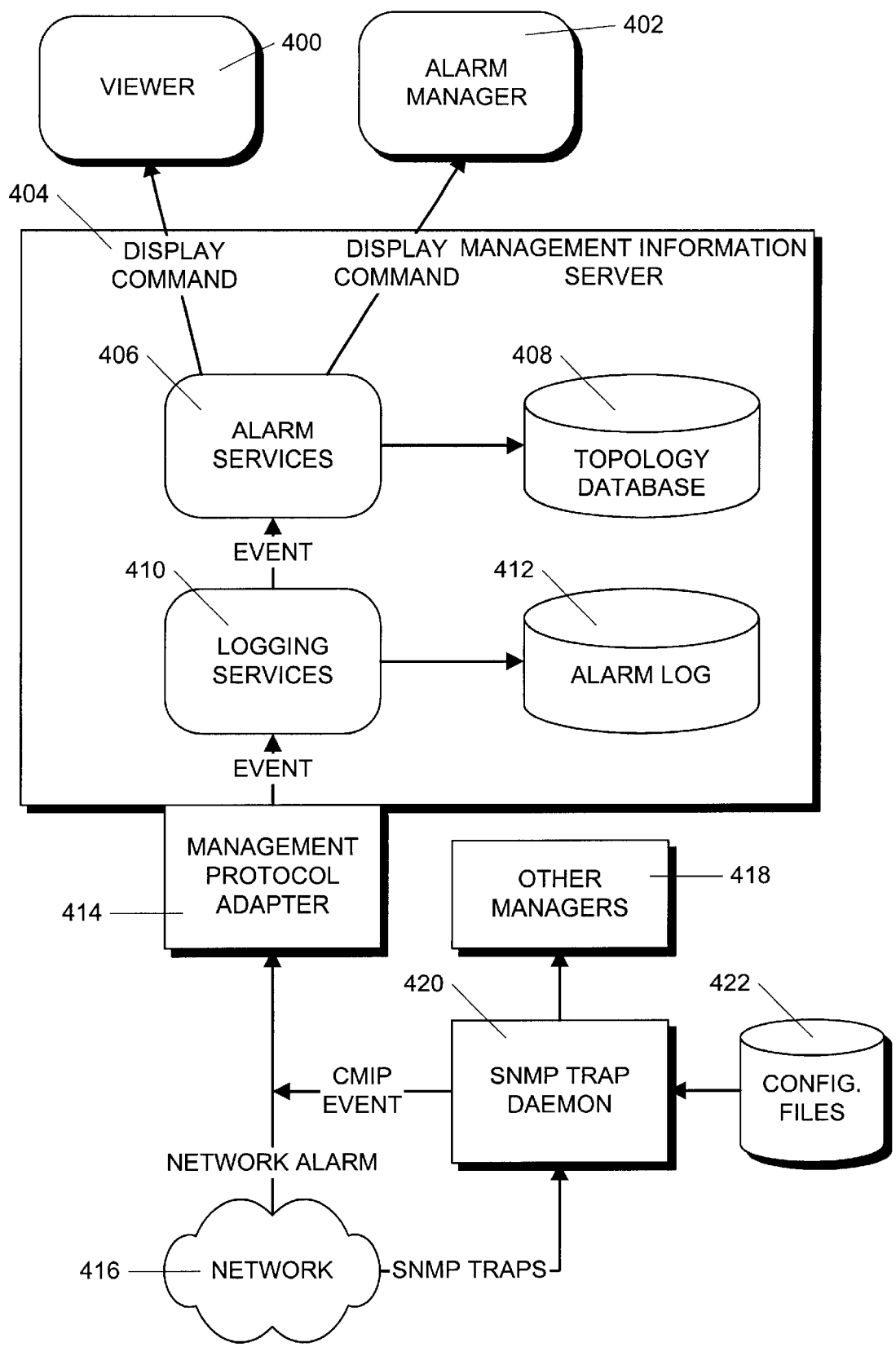
FIG. 4 is a block schematic diagram illustrating alarm services operation and trap processing in the Solstice EM™ distributed network management system.

FIG. 4 illustrates, in a schematic form, the processing of network alarms by a conventional Solstice EM™ network management system. In particular, agents connected to network 416 generate events or network alarms in response to conditions which occur in the resources with which they are associated. The network alarms arrive at a management protocol adapter 414 which processes the alarms and generates events that are provided to a logging services module 410. The logging services module 410 updates an alarm log database 412 by adding a record containing the alarm information.

In addition, logging services module 410 forwards the events to an alarm services module 406. The alarm services module 406 is responsible for updating the state of a corresponding node in the topology database 408. The alarm services module 406 also generates display commands which are provided to a viewer 400 and an alarm manager 402. For example, alarm services module 406, in response to an incoming alarm event, can issue a display command to the viewer 400 causing the viewer to modify the display icon associated with the resource. In response thereto, the viewer 400 can change the color or shape of the icon. In addition, the alarm services module 406 can send another display command to the alarm manager 402 causing it to add another line on its display representing the newly-received alarm event.

The SNMP trap daemon process 420 receives SNMP trap from network 416 by listening on a predetermined port (port 162). As will be discussed below, these traps are either converted to CMIP events and forwarded to the MIS 404 or forwarded as "raw" SNMP traps to other managers schematically represented by box 418. The SNMP trap daemon 420 reads configuration files 422 on startup. These files include the aforementioned trap_maps file and the trap_forward file.

Figure 5:
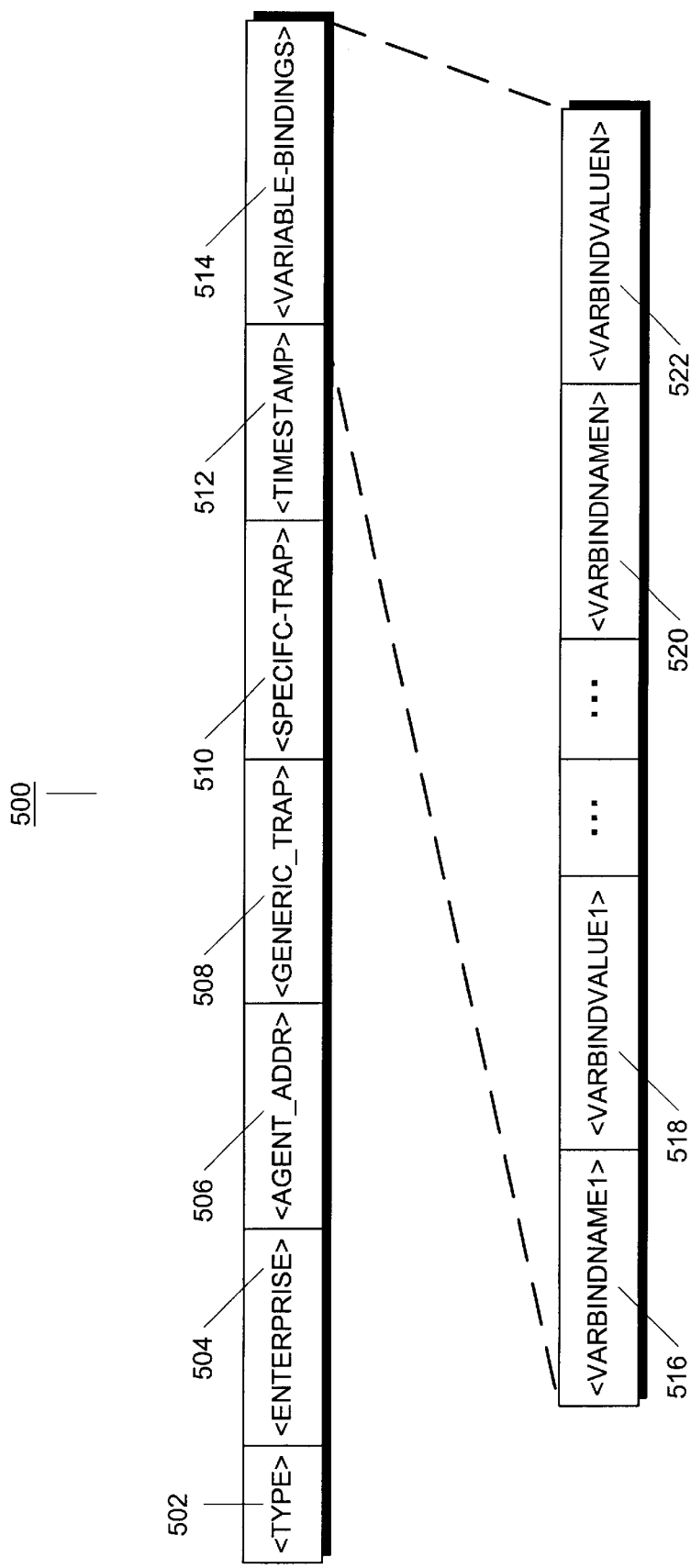
FIG. 5 is a schematic diagram of SNMP trap data fields.

The format of SNMP trap data that is received by the SNMP trap daemon is illustrated in FIG. 5 which shows the various fields that comprise the SNMP trap Protocol Data Unit (PDU) 500. These fields include the <type> field 502 which indicates the type of SNMP message. In the data shown in FIG. 5, the <type> field 502 indicates that the data is a trap PDU.)

The <enterprise> field 504 value indicates the subsystem that generated the trap. The <agent-addr> field 506 holds the network IP address of the source of the trap. The <generic-trap> field 508 holds an integer value in the range 0 to 6 indicating the standard trap type. The standard trap types are.

| <generic-trap> Value | Trap Type | Description |
| --- | --- | --- |
| 0 | coldStart | The originating SNMP device is reinitializing itself, typically due to unexpected reboot. |
| 1 | warmStart | The originating SNMP device is reinitializing itself, typically due to normal restart. |
| 2 | linkDown | One of the agent's communication links is down. The first name/value pair in the variable bindings is the ifIndex for the interface. |
| 3 | linkUp | One of the agent's communication links has come up. The first name/value pair in the variable bindings is the ifIndex for the interface. |
| 4 | authentication Failure | The originating system has received a protocol message that has failed authentication. |
| 5 | egpNeighborLoss | An External Gateway Protocol peer has been marked down. |
| 6 | enterpriseSpecific | Further information about the event is indicated in the <specific-trap> field. |

The <specific-trap> field 510 holds a device-specific value providing more information concerning the nature of the event which caused the trap. The <generic-trap> and <specific-trap> fields, 508 and 510, contain values that indicate the nature of the trap.

The <timestamp> field 512 holds a value representing the time between the last re-initialization of the agent system and the time when the trap was generated.

The <variable-bindings> fields 514 holds information that varies depending upon the particular implementation by the product vender. This field is shown expanded into fields 516, 518, 520 and 522. The field format consists of attribute/value pairs. Each attribute name, for example field 516 is followed by its value, field 518. Likewise, the name 520 is followed by the value 522.

When an SNMP trap arrives, the SNMP trap daemon extracts the IP address from the <agent-addr> field 506 in the SNMP trap PDU and uses this information to determine if there is an object configured in the MIS to represent that agent system. By default, a special cmipsnmpProxyAgent object instance in the MIS is used to represent SNMP agent systems.

If there is a cmipsnmpProxyAgent object in the MIS corresponding to the IP address in the <agent-addr> field 506, the trap daemon's default method of operation is to set the originating system's cmipsnmpProxyAgent instance as the source object instance for this alarm.

If there is no managed object instance in the MIS corresponding to the IP address of the SNMP trap, the trap daemon attempts to retrieve the hostname of the source agent, but if this is not possible, the trap daemon sets the value of cmipsnmpProxyAgentId to "<IP-address>".

If there are multiple objects in the MIS that have network addresses that match the IP address of the trap, trap daemon seeks a match on the SNMP Community String values included in the trap header (not shown.) For example, an SNMP agent may be a proxy for legacy devices, and the Community String provides information that is used to identify the source device for the alarm.

The trap daemon's default method of mapping SNMP traps into CMIP event notifications is determined by a mapping entry in the default trap_maps file. The default mapping uses a single scheme to convert traps for any <enterprise> field 504 identifier. The mapping is based on generic trap type.

In particular, the trap mapping file consists of blocks of records, with each block identified by the keyword "enterprise". Each block is in the following form:
enterprise <enterprise-object-identifier>
{
GENERIC-TRAP <generic-trap>
SPECIFIC-TRAP <specific-trap>
NOTIFICATION <alarm-type> | DISCARD
ATTRIBUTE-MAP
    <attr-name1>=<attr-value1>;
    <attr-nameN>=<attr-valueN>
FDN-MAP <FDN template>;;
}
As shown, the mapping records (one or more) for a given enterprise are grouped within a pair of curly braces. The SPECIFIC-TRAP and ATTRIBUTE-MAP fields are optional. The FDN-MAP is a an identifier that specifies a template for building a Fully Distinguished Name that points to a specific component that is the source of the event, such as an interface on a router or a circuit in a switch. A mapping for one or more event attributes can be entered after the keyword ATTRIBUTE-MAP. The field <attr-name> must be a valid attribute for the event type specified by <alarm-type>.

The field <attr-value> can be a constant, a trap variable binding value, or the keyword $ALLVARS which is used only with a text field. The $ALLVARS keyword specifies that the text field is to receive: the <enterprise> identifier of the trap, the <specific-trap> field value and all of the attribute/value pairs comprising the trap variable bindings.

Enterprise blocks in the trap_maps file select incoming traps for mapping if the <enterprise-object-identifier> in the block heading matches the <enterprise> field 504 in the trap PDU 500. The matching has three important aspects. First, the enterprise block identifier, <enterprise-object-identifier>, does not need to be identical with the <enterprise> field 504 of the trap PDU. For example, if the trap <enterprise> field 504 holds the value "1.3.6.1.4.1.42.1.2", this will match an enterprise block identifier of "1.3.6.1.4.1". So long as the enterprise block identifier is contained in the trap <enterprise> field 504, starting at the left, a match will occur.

Second, a trap is mapped by the first block in the trap_maps file whose enterprise block identifier its <enterprise> field matches. Therefore, a trap with the <enterprise> field value 1.3.6.1.4.1 will match the first block of the following trap_maps file segment:
. . .
enterprise 1.3.6.1.4.1.46{ . . . }
enterprise 1.3.6.1.4.1{ . . . }
. . .

If an incoming trap has an <enterprise> field 504 that matches the <enterprise-object-identifier> of one of the blocks in the trap_maps file, but fails to match any entry in that block, it may still be mapped if it matches another enterprise block later in the file. Traps are checked against the enterprise blocks in the trap_maps file sequentially, starting at the top.

If the trap daemon determines that an incoming trap matches a mapping block in the trap_maps file with its <enterprise> field 504, the trap daemon then uses the first mapping record within the selected block that matches the trap on both the <generic-trap> field 508 and the <specific-trap> field 510. If the trap matches no mapping record in any matching enterprise block, it is mapped into a network alarm.

If there is a match on the <enterprise> value, the <generic-trap> value and the <specific-trap> value, then the trap is converted to the CMIP event notification type indicated by the keyword NOTIFICATION. For example, an SNMP linkDown trap could be mapped to a CMIP communicationsAlarm event, as indicated in the following example:
enterprise 1.3.6.1.4.1.42{
GENERIC-TRAP 2
NOTIFICATION communicationsAlarm
ATTRIBUTE-MAP
   perceivedSeverity=varbindvalue3;
   probableCause=varbindvalue2;
FDN-MAP
   internetClassld={interfaces 0}/internetClassld=
     {ifTable 0}/internetClassld=
     {ifEntry varbindvalue1};;
}

Since the translation between SNMP traps and the CMIP event notifications is controlled by the trap_maps file, the format of this file can be modified to provide enhanced operation in accordance with the principles of the invention. In the description which follows, specific modifications are discussed, but those skilled in the art will recognize that other similar modifications can be made to achieve the advantages accorded by the invention without departing from the spirit and scope of the invention. In addition to the modifications to the trap_maps file, the parsing of the file by the SNMP trap daemon to generate internal data structures used by the daemon to convert SNMP traps is also discussed.

In accordance with the principles of the present invention, the format of the trap_maps file has been modified to include "wildcard" elements that match ranges and sets of GENERIC-TRAP and SPECIFIC-TRAP values. In particular, in order to match all traps with a specific <enterprise field> 504 value, an asterisk wildcard meaning "match anything" is used in the GENERIC-TRAP field. For example, the following trap_maps entry discards all traps generated by 3Com devices in enterprise 1.3.6.1.4.1.43:
enterprise 1.3.6.1.4.1.43 {
GENERIC-TRAP *
NOTIFICATION DISCARD
FDN-MAP;;
}

To match a range of GENERIC-TRAP or SPECIFIC-TRAP values, the numerical range can be listed with a dash between the range limits, as in the following example which assigns different severities based on a trap SPECIFIC-TRAP field value:
enterprise 1.3.6.1.4.1.9 {
GENERIC-TRAP 6
SPECIFIC-TRAP 0–12
NOTIFICATION enterpriseSpecificTrap
ATTRIBUTE-MAP
   probableCause=varbindvalue1;
   perceivedSeverity=minor;
   additionalText=$ALLVARS;
FDN-MAP;;
}

To match a specific number and higher, an asterisk can be used as the ranges upper bound as indicated in the following example:
enterprise 1.3.6.1.4.1.9 {
GENERIC-TRAP 6
match all values 26 and higher
SPECIFIC-TRAP 26-*
NOTIFICATION enterpriseSpecificTrap
ATTRIBUTE-MAP
   probableCause=varbindvalue1;
   perceivedSeverity=major;
   additionalText=$ALLVARS;
FDN-MAP;;
}

A comma-separated set of values can be included to match a non-continuous set of values. The set may contain sub-ranges as in the following example:
enterprise 1.3.6.1.4.1.9 {
GENERIC-TRAP 6
SPECIFIC-TRAP 13–25, 27, 29, 31–40
NOTIFICATION enterpriseSpecificTrap
ATTRIBUTE-MAP
   probableCause=varbindvalue1;
   perceivedSeverity=indeterminate;
   additionalText=$ALLVARS;
FDN-MAP;;
}

Modifications have also been made to support variable type conversion and concatenation. Varbind names refer to the part of a varbind instance identifier that names the object being referenced, minus index information. For example, in the following sample varbind set:

| Instance | Value |
| --- | --- |
| 1.3.6.1.2.1.2.2.1.8.3[a] | 2[b] |
| 1.3.6.1.2.1.2.2.1.7.3[c] | 1[d] |

[a]IfOperStatus.3
[b]down
[c]IfOperStatus.3
[d]up the varbind name for the first varbind of would be 1.3.6.1.2.1.2.2.1.8. Varbind names can be referenced in the trap_maps file using a varbindNameN variable analog to a valueValue variable, where N is the varbind number. For example, a notification generated from the following attribute mapping and assuming varbinds from the above varbind set, would yield 1.3.6.1.2.1.2.2.1.7.
enterprise 1.3.6.1.4.1.9 {
GENERIC-TRAP 6
SPECIFIC-TRAP 13–25, 27, 29, 31–40
NOTIFICATION enterpriseSpecificTrap
ATTRIBUTE-MAP
   probableCause=varbindName2;
   perceivedSeverity=indeterminate;
   additionalText=$ALLVARS;
FDN-MAP;;
}

Varbind indexes are also used to improve matching characteristics. These are the index value of varbind instances. They are zero for scalar instances and a non-zero number for table entries. Varbind names can be referenced in the trap_maps file using a VarbindIndexN using variable analogues to a varbind valueValue variable. For example, the value of varbindIndex2 for the varbinds set above would be the table index 3.

Also, matching can be improved in accordance with the principles of the invention by using string concatenation. A varbind value, name, or index can be placed within a string by preceding its name with a dollar sign. The following example illustrates a linkDown trap mapping with a verbose additionalText attribute exploiting string concatenation:

enterprise 1.3.6.1.4.1 {
GENERIC-TRAP 2
NOTIFICATION verboseNotification
ATTRIBUTE-MAP
   probableCause=varbindvalue1;
   perceivedSeverity=major;
      causeText="The varbind value is $varbindValue1";
      nameText="The varbind name is $varbindName1"
      indexText="The varbind index is $varbindIndex1"
FDN-MAP;;
}

Varbind values are converted into DisplayString representation for inclusion in a string. A dollar sign may be embedded within a string by preceding it with a backslash.

Figure 6:
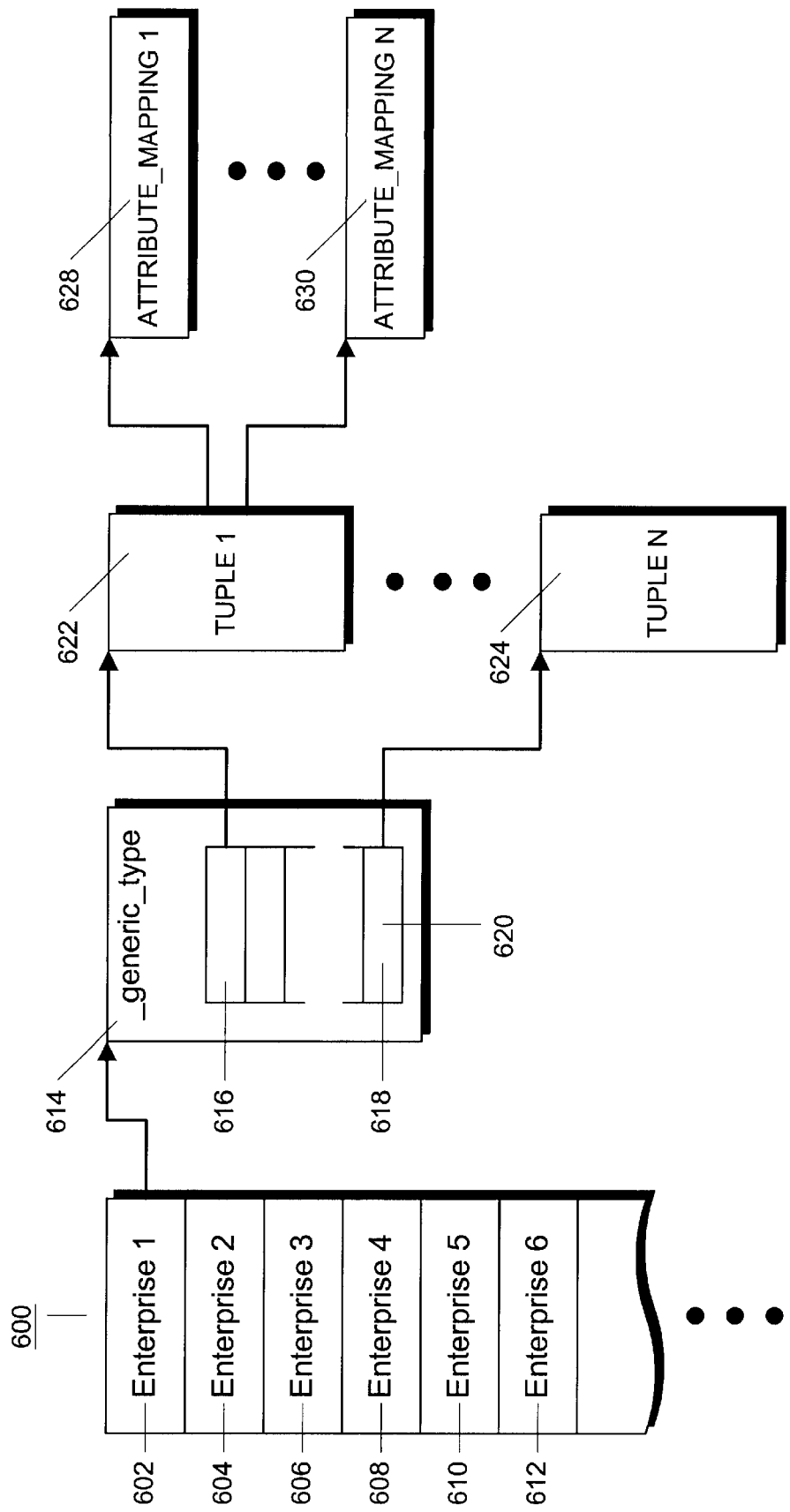
FIG. 6 schematically illustrates various data structures used in the forwarding and mapping processes and the relationship of the data structures.

As previously mentioned, the contents of the trap_maps file are parsed into various data structures which are used by the trap daemon to process the incoming traps. The parser can be a conventional yacc-generated parser and the resulting data structures are illustrated in FIG. 6. The first structure is the ENTERPRISE structure 602 which holds trap mapping information for all traps within an enterprise block. A plurality of ENTERPRISE structures, 602–612, are included in a queue 600 in a manner which will be explained below. The ENTERPRISE structure 602 is defined as follows:

typedef struct_enterprise {
  Oid oid; // OID of the enterprise block
  /* specific trap mappings */
  struct_generic_type generic_traps[7];
} ENTERPRISE;

where oid is the enterprise object identifier of the structures traps (described below) and generic_traps is an instance of the _generic_type structure and is described below.

In particular, mapping information for each generic trap type is held in a _generic_type structure 614 illustrated below indexed by the GENERIC-TRAP value of the trap.
struct_generic_type {
  int number_of_elements;
  RWGSlist (TUPLE) tuples;

The _generic_type structure 614 is primarily a container for a list 620 of TUPLE structures 622–624 which hold trap mapping information. Each element in the list 616–618 points to a TUPLE structure. Each TUPLE structure 622 (illustrated below), in turn, holds information for forwarding and mapping an individual trap. The generic trap to which the a TUPLE 622 refers is determined by the index in the ENTERPRISE structure of its containing _generic_type structure 614.
typedef struct_tuple {
  unsigned long specific_type_lower;
  unsigned long specific_type_upper;
  RWCString notification_type;
  RWGSlist(ATTRIBUTE_MAPPING) attribute_map;
  // Used to forward traps
  unsigned short numHosts;
  int *hostFileDescs;
} TUPLE;

The TUPLES 622–624 can refer to one or more specific type values depending on how their specific_type_lower and specific_type_upper field values are set. The specific_type_lower and specific_type_upper fields hold the range of SPECIFIC-TRAP values that the TUPLE matches. Ranges and match-all wildcards operations are implemented by manipulating these values as described below. The numHosts and hostFileDescs fields are used to hold trap forwarding information as described below. The attribute_map field is a list of ATTRIBUTE_MAPPING structures 628–630 which are defined as follows:

typedef struct {
  RWCString attribute;
  RWCString value;
  Asn1Value encodedValue;
  enum MappingType type;
  unsigned short varbindNumber;
} ATTRIBUTE_MAPPING;

where the "attribute" field holds the textual attribute name of the notification attribute that the structure describes, the value field holds the textual attribute value as it appears in the trap_maps file, the type field holds an enumerated value that denotes the kind of mapping as determined by the value in the attribute map statement in the trap_maps file. The enum MappingType is one of the values CONSTANT, VARIABLE_STRING, VARBIND_VALUE, VARBIND_NAME, VARBIND_INDEX, ALL_VARS. The encodedValue is an ASN.1 encoding of value. It is only used if value is not variable (type equals CONSTANT). Finally, the varbindNumber field holds the trap varbind number referenced in the VARBIND_VALUE, VARBIND_NAME, or VARBIND_INDEX type mapping. It is unused for other mapping types.

Each ATTRIBUTE_MAPPING structure 628, 630 holds information about the value a CMIP notification attribute is assigned, possibly including information from the trap on which it is based.

Wildcards are processed in the following manner. The SPECIFIC-TRAP wildcard elements are used to set the specific_type_lower and the specific_type_upper values of the TUPLE structures. The different wildcard elements are used to set the values as follows:

| Wildcard Value | Wildcard Type | Specific_type_lower | specific_type_upper |
|---|---|---|---|
| 1 | Match single value | 1 | 1 |
| * | Match all values | 0 | Maximum Integer possible (INT_MAX) |
| 2–10 | Match range between 2 and 10 | 2 | 10 |
| 2–* | Match all values 2 and above | 2 | INT_MAX |

If a set wildcard is used, as in the statement: SPECIFIC-TRAP 1, 3–5, 40-* then a TUPLE is created for each member of the set. So in the previous example, three TUPLEs would be created with specific_type_lower and specific_type_upper values of (1,1), (3,5) and (40, INT_MAX). Each of the three TUPLEs would hold the same trap mapping information.

After a trap_maps file entry has been completely parsed into a TUPLE, the TUPLE is inserted into the list 620 of TUPLEs held in the _generic_type structure 614. The specific_type_lower and specific_type_upper values of the new TUPLE are checked against the specific_type_ lower and the specific_type_upper values of all other TUPLEs to insure that they do not overlap with each other. If two TUPLES have overlapping ranges, then the new TUPLE is not added and an error is logged.

After an entire enterprise block has been parsed into an ENTERPRISE structure it is inserted into a global queue of ENTERPRISE structures 600. This queue 600 is ordered by the number of integers in the enterprise OID, with the longer OIDs nearer the top. So the enterprise blocks:
enterprise 1.3.6.1.4.1.6 { ... }
enterprise 1.3.6.1.4.1.9 { ... }
enterprise 1.3.6.1.4.1 { ... }
enterprise 1.3.6.1.4.1.9.1.141 { ... }
would be ordered:
enterprise 1.3.6.1.4.1.9.1.141 { ... }
enterprise 1.3.6.1.4.1.9{ ... }
enterprise 1.3.6.1.4.1.6{ ... }
enterprise 1.3.6.1.4.1{ ... }

This ordering insures that when the queue 600 is searched sequentially at runtime, the OID that most closely matches a trap enterprise OID is encountered before OIDs that do not match as closely.

Type conversion between varbind values and attribute values is possible for a subset of types as follows:

| Varbind Type | Permitted Event-Report Attribute Types |
|---|---|
| INTEGER | OCTET STRING, displayString, Opaque |
| OCTET STRING and DisplayString | INTEGER, OBJECT IDENTIFIER, NetworkAddress, DisplayString |
| OBJECT IDENTIFIER | OCTET STRING, Opaque, DdisplayString |
| NetworkAddress | OCTET STRING, Opaque, DisplayString |

A function exists to support each kind of type conversion. The functions all have the form:
Result convert VarbindType To AttributeType (const Asn1Value vatbindValue, Asn1Value& attributeValue)
where varbindValue is an ASN.1 value of type VarbindType, and attributeValue is passed by reference and gets assigned the converted value of type AttributeType. The return type indicates if the conversion was successful. A generic conversion function, convertASN1Value( ), is provided to dispatch the proper conversion function given an ASN.1 string and a target type. This function has the form:
enum VarbindType {INTEGER, OCTET_STRING, DISPLAY_STRING, OBJECT_IDENTIFIER, NETWORK_ADDRESS, OPAQUE};
void convertASNValue(Asn1Value varbindValue, const enum VarbindType destinationType, Asn1Value& attributeValue)

These functions are used by the SNMP trap daemon to perform the conversions. If a conversion fails, convertASN1Value ( ) sends an error notification and returns null as the conversion value. The individual functions which convert between varbind values and attributes follow.
Integer Conversion
Integer to string conversion functions generate base-ten representations.
Result convertINTEGERtoOSTRING(const Asn1Value integer, Asn1Value &octetString);
Result convertINTEGERtoDisplayString(const Asn1Value integer, Asn1Value &octetString);
Result convertINTEGERtoOpaque(const Asn1Value integer, Asn1Value &octetString);
String Conversion
Unlike other conversions, string conversions can fail because of the value of a being converted. For example, the string "xyz" cannot be represented as an integer.

Result convertOSTRINGtoINTEGER(const Asn1Value string, Asn1Value &integer);
Result convertOSTRINGtoOID(const Asn1Value string, Asn1Value &oid);
Result convertOSTRINGtoNewtorkAddress(const Asn1Value integer, Asn1Value &octetString);
Result convertOSTRINGtoDisplayString(const Asn1Value string, Asn1Value &string);
If any of the octet string characters are not printable, they will be converted into hash (#) signs. For example, the octet string 65.1.66.67 would become the equivalent to the text string"A#BC".
Object Identifier Conversion
These conversions are as follows:
Result convertOIDtoOSTRING(const Asn1 Value oid, Asn1Value& string);
Result convertOIDtoOpaque(const Asn1Value oid, An1Value& opaque);
Result convertOIDtoDiplayString(const Asn1 Value oid, Asn1Value& string);
Network Address
These conversions are as follows:
Result convertNetworkAddressToOSTRING(const Asn1Value addr, Asn1Value& string);
Result convertNetworkAddressToOpaque(const Asn1Value addr, Asn1Value& opaque);
Result convertNetworkAddressToDisplayString(const Asn1Value addr, Asn1Value& string);

A set of functions is also provided to extract individual varbind values from a trap sequence of varbinds. The first two of these functions extract a varbind name. The first function is:
Asn1Value getVarbindName(const Asn1Value varbindList, int varbindNumber)
This function returns the OID of the variable name for the varbindNumber ed varbind. This does not include any table index number or the zero index for scalars.
Asn1Value getvarbindIndex(const Asn1Value varbindList, int varbindNumber)
This function returns the trailing index OID of a varbind variable. This is either zero for a scalar object, or a string of one or more indices into a table.
The next function extracts a specific varbind value from a varbind list.
Asn1Value getVarbindValue(const Asn1Value varbindList, int varbindNumber)
String concatenation allows information from trap varbind values to be embedded within a string. Varbind values, names, and indexes may be included in a string, as in the string:
"The second varbind has value $varbindValue2"
Variables are expanded at the time that a CMIP notification is being generated from an SNMP trap. The following function, expandAttributeValueString, uses the varbind extraction functions to get varbind information, and conversion functions are provided to change the varbinds into strings.
RWCString expandAttributeValueString(const RWCString string, const Asn1Value trapVarbindList)
All embedded varbinds must have valid string representations, if they do not, an error notification will log an error and the string "conversion failure" will be embedded in place of the variable.

In accordance with the principles of the invention, forwarding of SNMP traps to other managers has been made more specific by including per-host trap filtering in the trap_forward file. In order to perform filtering filters are optionally inserted between curly braces after an MIS_HOST or SNMP_HOST statement. Any statement without a filter receives all traps. The format for defining filters is similar to matching done within the trap_maps file, In particular, statement matching GENERIC-TRAP and SPECIFIC-TRAP values are nested inside enterprise statements as in the following examples:

MIS_HOST h 1, h 2 {
   enterprise enterprise-oid$_1$ {
      FilterStatement$_1$
      FilterStatement$_2$
      . . .
   }
   enterprise enterprise-oid$_2$ {
      FilterStatement$_3$
      FilterStatement$_4$
      . . .
   }
   . . .
}
SNMP_HOST h$_3$: port, h$_4$:port {
   enterprise enterprise-oid$_3$ {
      FilterStatement$_5$
      FilterStatement$_6$
      . . .
   }
   enterprise enterprise-oid$_4$ {
      FilterStatement$_7$
      FilterStatement$_8$
      . . .
   } . . .
}

Filter statements have the general form:
GENERIC-TRAP value-or-wildcard
[SPECIFIC-TRAP value-or-wildcard]
DISCARD The "value-or-wildcard" value can be any value valid for a trap_maps GENERIC-TRAP or SPECIFIC-TRAP statement, as discussed above. The SPECIFIC-TRAP clause need only be present if the GENERIC-TRAP value is 6.

For example, the following statements filter out all 3Com traps (enterprise 1.3.6.1.4.1.43) for MIS hosts manager1 and manager2:
MIS_HOST: manager1, manager2 {
filter out all generic 3com traps for manager2 and manager3
   enterprise 1.3.6.1.4.1.43 {
      GENERIC-TRAP 1–5
      DISCARD
   }
}

Filtering out a subset of enterprise-specific Cisco traps from SNMP managers would be done with the following statement:
SNMP_HOST: manager3, manager4 {
Filter out some Cisco and Sun traps
   enterprise 1.3.6.1.4.1.9 {
      GENERIC-TRAP 6
      SPECIFIC-TRAP 1, 3, 5, 7-*
      DISCARD
   }
}
SNMP_TRAPS: manager7 manager8

Note that only managers 3 and 4 would not receive Cisco traps, manager7 and manager8 which do not have filtering blocks, receive all traps.

When the trap_forward file information is read by the SNMP trap daemon, the trap_forward filtering information is parsed into a queue of ENTERPRISE structures organized in the same way as the trap_maps file entries discussed above and illustrated in FIG. 6. The TUPLE structures nested in the ENTERPRISE structure include several members. The hostFileDescs array is an array of file descriptors which either point to the SNMP trap daemon instances responsible for forwarding traps to other MIS, or sockets for connecting to SNMP agents, as discussed below. In order to conserve file descriptors, only a single host connection is used, regardless of how many host file descriptors exist across multiple TUPLES. The numHosts field holds the size of the hostFileDescs array.

The ENTERPRISE queue used for managing trap forwarding is organized identically to the queue 600 used for trap mapping discussed above.

Figure 7:
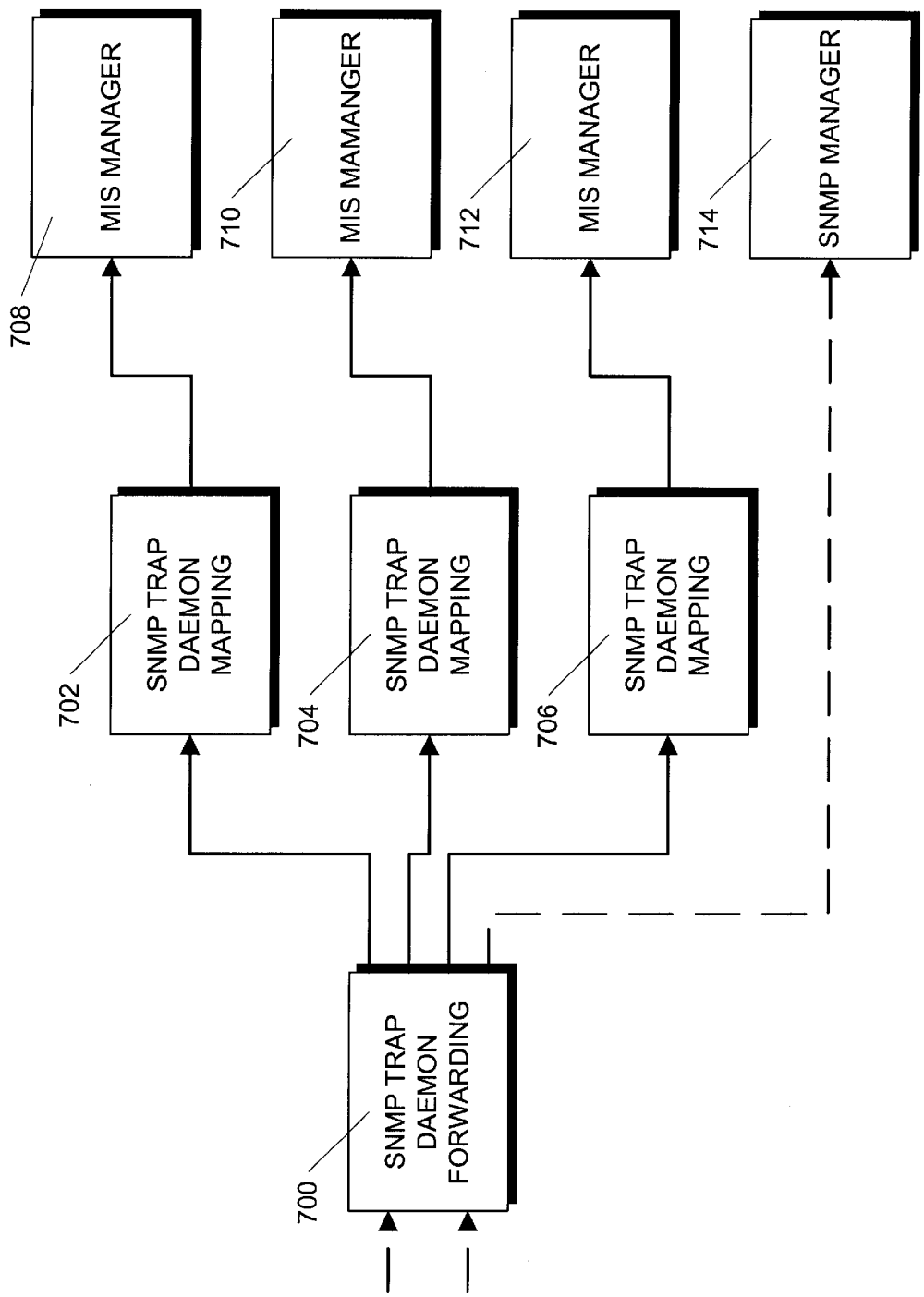
FIG. 7 is a schematic block diagram showing the primary and secondary processes performed by an SNMP trap daemon in forwarding SNMP traps and mapping SNMP traps to CMIP events.
Figure 8:
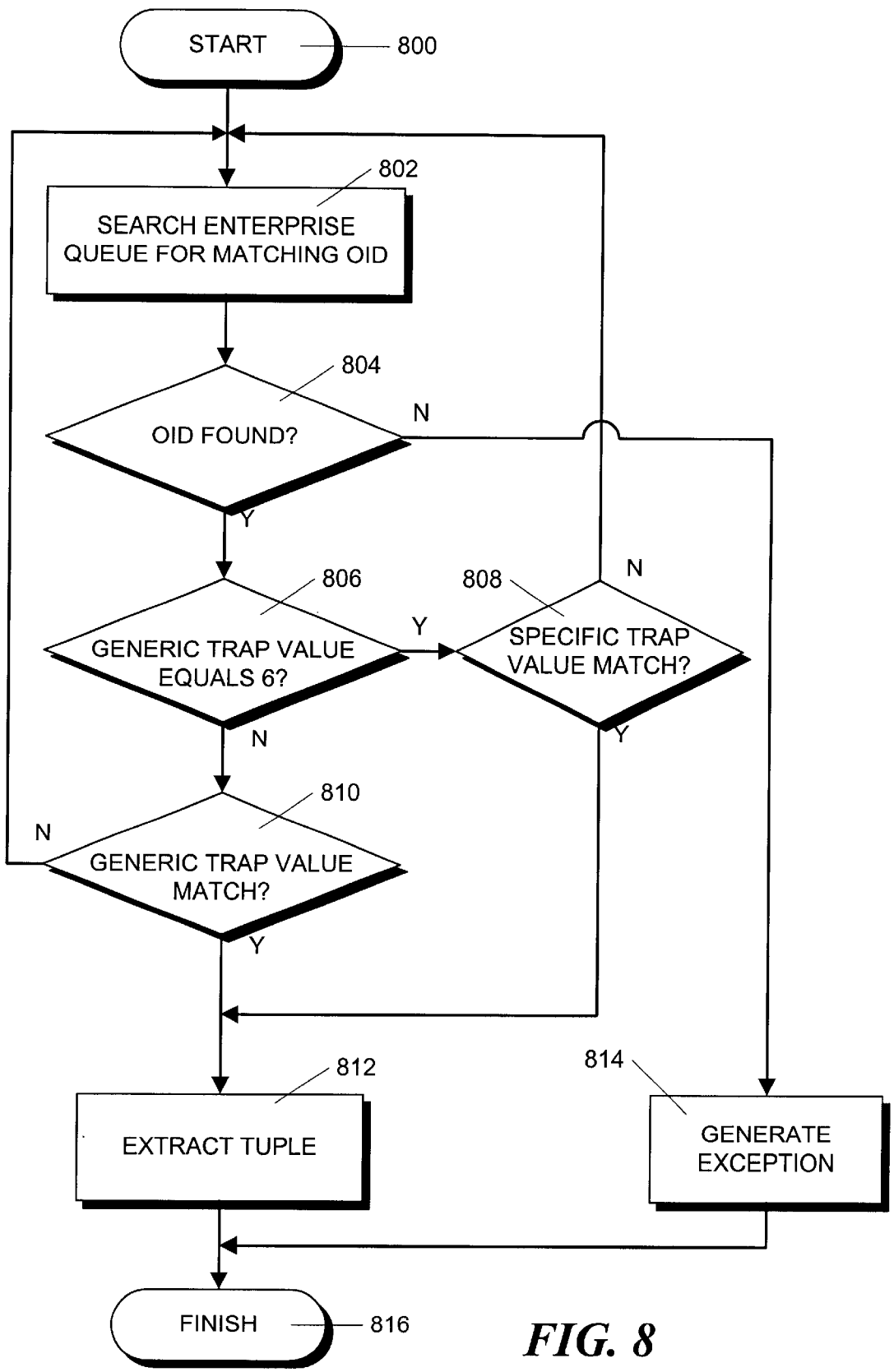
FIG. 8 is a flowchart of steps performed in an illustrative search process for extracting TUPLE information from ENTERPRISE structures.

Processing of the traps by the SNMP trap daemon is illustrated in FIG. 7 and consists of a primary, or forwarding, process 700 and several secondary or mapping processes 702–706. When a trap is received by the SNMP trap daemon, it must be examined to discover the hosts to which it will be forwarded. This is done in a forward_packet( ) function in the forwarding process 700 by finding the TUPLE structure that holds the host information for the trap. That TUPLE is contained in the queue of ENTERPRISE structures (600, FIG. 6) using the searching method illustrated in FIG. 8.

The process starts in step 800 and proceeds to step 802, in which the queue 600 is searched for the first ENTERPRISE structure with an oid value that is a sub-string of the trap enterprise value. In step 804, a determination is made whether an enterprise structure was found. If not an excpetion is generated in step 814 and the process ends in step 816.

Alternatively, if, in step 804, an enterprise structure is found, then a check is made in step 806 to determine whether the GENERIC-TRAP value of the trap equals 6. If so, a SPECIFIC-TRAP value should be present and the process proceeds to step 808 where the SPECIFIC-TRAP value of the trap is checked against the corresponding SPECIFIC-TRAP value of the located ENTERPRISE structure. If there is a match, the process proceeds to step 812 to extract the TUPLE information. The process then ends in step 816.

If, in step 806. It is determined that the GENERIC-TRAP value is not 6, then the GENERIC TRAP value of the trap is compared to the GENERIC TRAP value of the located ENTERPRISE structure in step 810. If there is a match, the process proceeds to step 812 where the TUPLE information is extracted. The process then ends in step 816.

If the GENERIC-TRAP values do not match then the process proceeds back to step 802 where the ENTERPRISE queue is searched to find another matching oid. Operation continues in this manner until a TUPLE is extracted or an excpetion is thrown.

When the specific TUPLE structure is found, the raw trap information is forwarded to all file descriptors in the hosts-FileDescs array member. These hosts will either be SNMP Managers 714, in which case the UDP trap information is forwarded directly, or other SNMP trap processes 702–706 in which case the trap information is forwarded over an interprocess pipe. Each trap process 702–706 has a platform connection to an MIS, 708–712, respectively.

Once a trap is received by the SNMP trap mapping processes, the trap notification mapping is looked up and then, based on the mapping, a notification is created. In particular, the TUPLE information in the trap_maps file is extracted using the search process illustrated in FIG. 8.

The extracted TUPLE structure holds the information necessary to form the notification including zero or more ATTRIBUTE_MAPPING structures (628, 630, FIG. 6.) Each ATTRIBUTE_MAPPING structure holds the information for setting one notification attribute value. A function snmp_form_event_info( ) in the mapping processes is responsible for setting notification attributes (i.e. the event_info). The function performs one or more actions based on the ATTRIBUTE_MAPPING's type member. In particular, the function encodes constant attribute values held in the ATTRIBUTE_MAPPING structures into ASN.1 code. The function also creates a DisplayString using the contained varbind information and the expandAttributeValueString( ) method described above. Finally, the function expands a varbind variable using the getVarbindName( ), getvarbindIndex( ) and getVarbindValue( ) methods described above.

The following pseudo-code snippet demonstrates a switch statement which can be used to call the various methods based on the mapping type field in the ATTRIBUTE_MAPPING structure:

```
ATTRIBUTE_MAPPING mapping; // contains mapping
    information
String attributeValue;
Asn1Value encodedAttributeValue
Asn1Value trapVarbindList;
switch (mapping.type) {
    case CONSTANT:
        encodedAttributeValue=mapping.encodedValue;
        break;
    case VARIABLE_STRING:
        // expand the string and encode it
        attributeValue=expandVars(mapping.value);
        encodedAttributeValue=encode(mapping.value);
        break;
    case VARBIND_VALUE:
        // encode the traps Nth varbind value
        encodedAttributeValue=getVarbindValue(
            trapVarbindList, mapping.varbindNumber);
        break;
    case VARBIND_NAME:
        // encode the traps Nth varbind name
        encodedAttributeValue=getVarbindName(
            trapVarbindList, mapping.varbindNumber);
        break;
    case VARBIND_NAME:
        // encode the traps Nth varbind index
        encodedAttributeValue=getvarbindIndex(
            trapVarbindList, mapping.varbindNumber);
        break;
    case ALL_VARS:
        // encode an $ALLVARS statement
        encodedAttributeValue=encodeAllVars
            (trapVarbindList);
}
// At this point we have an encoded attribute value Now we
    want to convert the encoded
//value into the notifications type, if need be.
if (encodedAttributeValue does not match notification's
    attribute type)
}
    result=convert  (encodedAttributeValue,
        notificationAttributesType);
        if (result==NOT_OK) {
            error ("Conversion failed");
        }else{
            Assign attribute
        {
}else{
    Assign attribute
}
```

Whenever either the trap_maps or trap_forward files are updated, the SNMP daemon must be restarted to take advantage of the new information. The daemon becomes aware of newly updated information by means of an MDR notification indicating that new classes have been added to the MIS. The primary SNMP trap process 700 registers itself for the notification and restarts itself whenever the notification is encountered. Alternatively, a command can explicitly be sent by a user. The primary SNMP trap process restarts itself whenever the command is encountered. If the command is sent to a secondary process (702–706, FIG. 7), that process forwards it to the primary process.

After the SNMP daemon is notified of an update, it stops accepting new traps and processes all queued traps. The primary process 700 then closes all the pipes to its secondary processes, 702–706, and calls an execv method with a copy of its original argv parameter array. The secondary processes 702–706 then exit upon reading an EOF from their pipe.

Figure 9A:
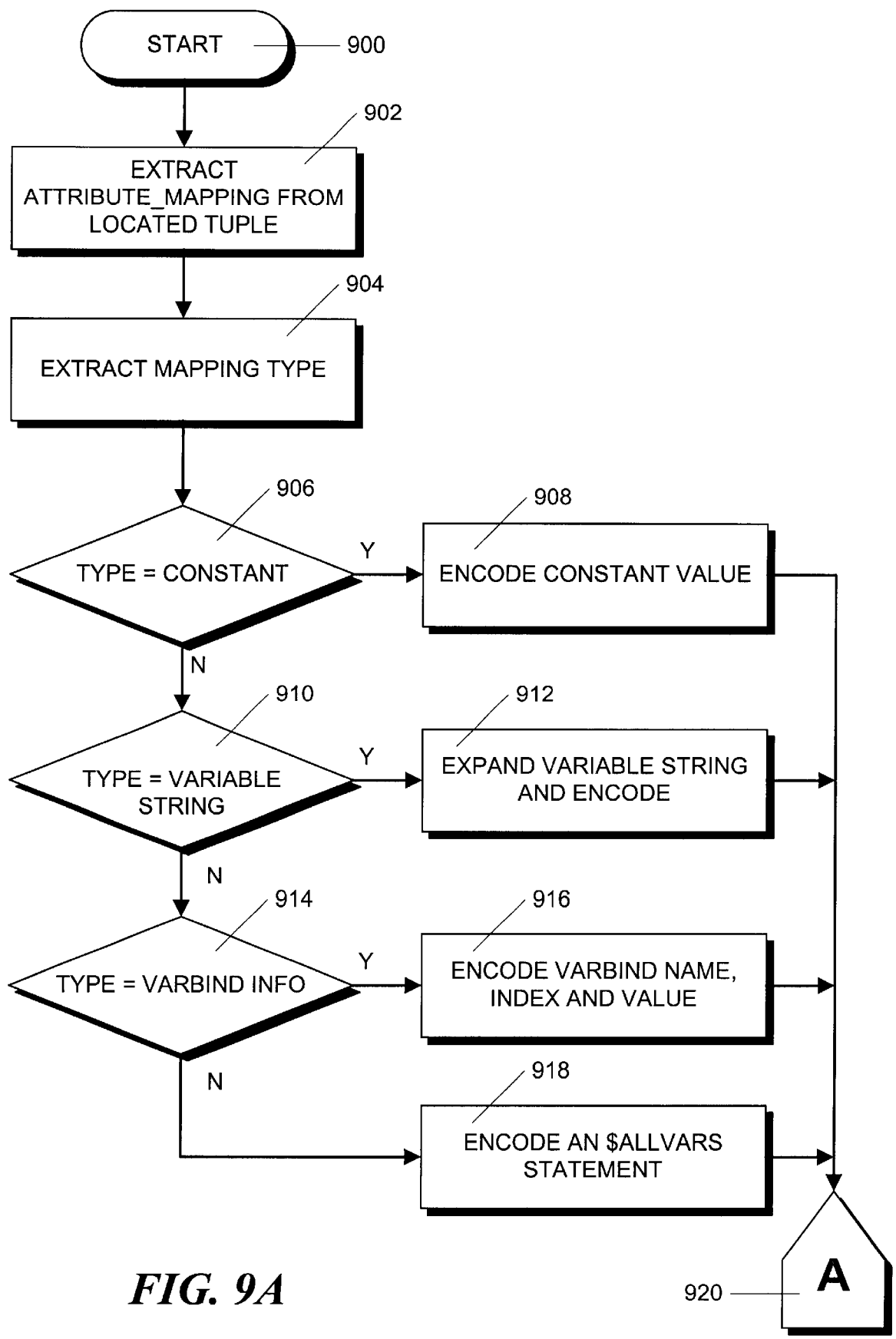
FIGS. 9A and 9B, when placed together, form a flowchart of steps performed in mapping SNMP traps to CMIP events.
Figure 9B:
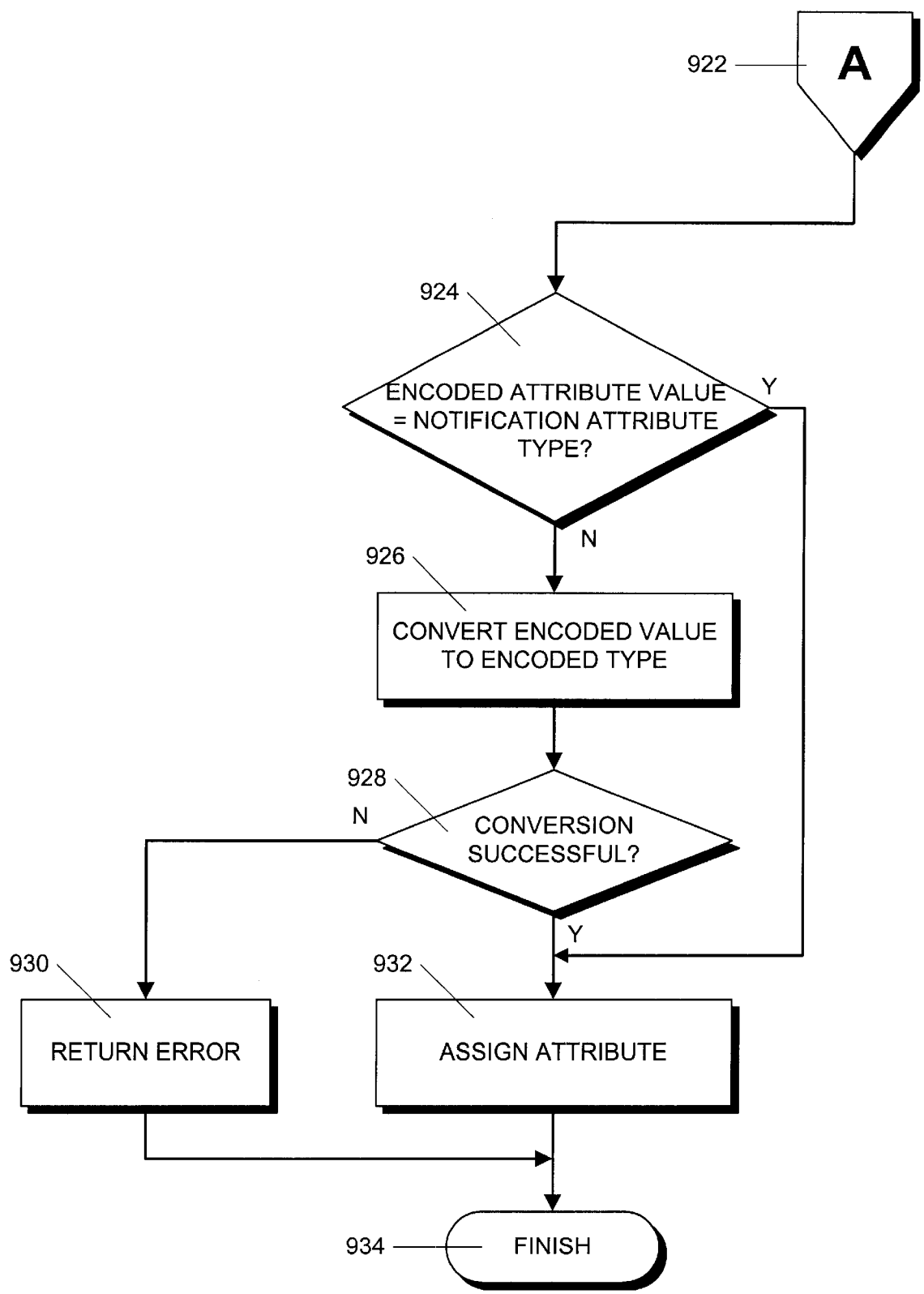

Whenever an error occurs that the user should be aware of, the error message is printed to the console. This can all be done through the function:
enum SEVERITY_TYPE { CRITICAL, MAJOR, MINOR, WARNING, INDETERMINATE };
postError(char *message, SEVERITY_TYPE severity);

FIGS. 9A and 9B illustrate the steps performed by the above pseudo-code. The process starts in step 900 and immediately proceeds to step 902 in which the ATTRIBUTE_MAPPING structure is extracted from the located TUPLE structure. In step 904, the mapping type is extracted from the ATTRIBUTE_MAPPING structure.

In steps 906–914, the mapping type variable is used to determine the encoding operation. For example, if the mapping type is a constant as determined in step 906, then the constant value is encoded in step 908. If the mapping type is a variable string as determined in step 910, then the variable string is expanded and then encoded in step 912. Alternatively, if the mapping type is varbind information, such as a varbind name, a varbind index or a varbind value, as determined in step 914, then the name, index or value is encoded in step 916. If the type is not a constant, variable string or varbind information, then an ALLVARS statement is encoded in step 918.

In any case, the process proceeds, via off-page connectors 920 and 922, to step 924 in which a determination is made whether the encoded attribute type matches the notification attribute type. If there is a match, then the process assigns the attribute to the notification in step 932 and finishes in step 934.

Alternatively, if there is not a match in step 924, a conversion must be made in step 926. If the conversion is successful as determined in step 928, then the process assigns the attribute to the notification in step 932 and finishes in step 934.

Finally, if there is a conversion error, the error is returned in step 930 and the process finishes in step 934.

A software implementation of the above-described embodiment may comprise a series of computer instructions either fixed on a tangible medium, such as a computer readable media, e.g. a diskette, a CD-ROM, a ROM memory, or a fixed disk, or transmissible to a computer system, via a modem or other interface device over a medium. The medium can be either a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular hardware system and operating system, other hardware and operating system software could be used in the same manner as that described. Other aspects, such as the specific instructions utilized to achieve a particular function, as well as other modifications to the inventive concept are intended to be covered by the appended claims.

What is claimed is:

1. A method operable in a distributed network management system for processing SNMP traps having variable values therein, the network management system having an SNMP trap daemon for receiving the traps and a mapping file having a plurality of records for controlling the conversion of the SNMP traps to events, the method comprising the steps of:

(a) modifying the mapping file records to include wildcard elements which match a plurality of variable values in the SNMP traps; and (b) converting the wildcard elements in the mapping file into data structures which incorporate limits derived from the wildcard elements.

2. A method according to claim 1 further comprising the step of:

(c) comparing the wildcard elements to the data structure limits to select one of the records for controlling the conversion of the SNMP traps to events.

3. A method according to claim 1 wherein step (b) comprises the step of:

(b1) converting each wildcard element to a limit which has an extreme value.

4. A method operable in a distributed network management system for processing SNMP traps having variable values therein, the network management system having an SNMP trap daemon for receiving the traps and a mapping file having a plurality of records for controlling the conversion of the SNMP traps to events, the method comprising the steps of:

(a) selecting one of the records in response to an SNMP trap;

(b) modifying the variable values in response to the variable values in the selected record; and (c) assigning the modified variable values to the event attributes.

5. A method according to claim 4 wherein step (b) comprises the step of:

(b1) converting variable values of one type to event attribute values of another type when the variable value type does not match the event attribute type.

6. A method according to claim 4 wherein step (b) comprises the step of:

(b2) converting selected variable values to text strings and assigning the text strings to event attributes.

7. A method operable in a distributed network management system for processing SNMP traps having variable values therein, the network management system having an SNMP trap daemon for receiving the traps and a forwarding file having a plurality of records for controlling the forwarding of the SNMP traps to at least one destination, the method comprising the steps of:

(a) modifying the forwarding file records to include filter elements which match a plurality of variable values in the SNMP traps; and (b) converting the filter elements in the forwarding file into data structures which incorporate matching values derived from the filter elements.

8. A method according to claim 7 further comprising the step of:

(c) comparing the variable values in the SNMP traps to the data structure matching values to select one of the records for forwarding the SNMP traps to the at least one destination.

9. A method according to claim 7 wherein step (a) comprises the step of:

(a1) modifying the mapping file records to include wildcard elements which match a plurality of variable values in the SNMP traps.

10. A method according to claim 9 wherein step (b) comprises the step of:

(b1) converting each wildcard element to a data structure limit which has an extreme value.

11. A computer program product operable in a distributed network management system for processing SNMP traps having variable values therein, the network management system having an SNMP trap daemon for receiving the traps and a mapping file having a plurality of records for controlling the conversion of the SNMP traps to events, the computer program product comprising a computer usable medium having computer readable program code thereon, including:

program code for modifying the mapping file records to include wildcard elements which match a plurality of variable values in the SNMP traps; and program code for converting the wildcard elements in the mapping file into data structures which incorporate limits derived from the wildcard elements.

12. A computer program product operable in a distributed network management system for processing SNMP traps having variable values therein, the network management system having an SNMP trap daemon for receiving the traps and a mapping file having a plurality of records for controlling the conversion of the SNMP traps to events, the computer program product comprising a computer usable medium having computer readable program code thereon, including:

program code for selecting one of the records in response to an SNMP trap;

program code for modifying the variable values in response to the variable values in the selected record; and program code for assigning the modified variable values to the event attributes.

13. A computer program product operable in a distributed network management system for processing SNMP traps having variable values therein, the network management system having an SNMP trap daemon for receiving the traps and a forwarding file having a plurality of records for controlling the forwarding of the SNMP traps to at least one destination, the computer program product comprising a computer usable medium having computer readable program code thereon, including:

program code for modifying the forwarding file records to include filter elements which match a plurality of variable values in the SNMP traps; and program code for converting the filter elements in the forwarding file into data structures which incorporate matching values derived from the filter elements.

14. Apparatus operable in a distributed network management system for processing SNMP traps having variable values therein, the network management system having an SNMP trap daemon for receiving the traps and a mapping file having a plurality of records for controlling the conversion of the SNMP traps to events, the apparatus comprising:

a mechanism for modifying the mapping file records to include wildcard elements which match a plurality of variable values in the SNMP traps; and a parser which converts the wildcard elements in the mapping file into data structures which incorporate limits derived from the wildcard elements.

15. Apparatus according to claim 14 further comprising a comparator which compares the wildcard elements to the data structure limits to select one of the records for controlling the conversion of the SNMP traps to events.

16. Apparatus according to claim 14 wherein the parser comprises a converter which converts each wildcard element to a limit which has an extreme value.

17. Apparatus operable in a distributed network management system for processing SNMP traps having variable values therein, the network management system having an SNMP trap daemon for receiving the traps and a mapping file having a plurality of records for controlling the conversion of the SNMP traps to events, the apparatus comprising:

a mechanism which selects one of the records in response to an SNMP trap;

a trap processing element which is responsive to the variable values in the selected record for modifying the variable values; and an assignment mechanism which assigns the modified variable values to the event attributes.

18. Apparatus according to claim 17 wherein the trap processing element comprises a function for converting variable values of one type to event attribute values of another type when the variable value type does not match the event attribute type.

19. Apparatus according to claim 17 wherein the trap processing element comprises a function for converting selected variable values to text strings and assigning the text strings to event attributes.

20. Apparatus operable in a distributed network management system for processing SNMP traps having variable values therein, the network management system having an SNMP trap daemon for receiving the traps and a forwarding file having a plurality of records for controlling the forwarding of the SNMP traps to at least one destination, the apparatus comprising:

a mechanism for modifying the forwarding file records to include filter elements which match a plurality of variable values in the SNMP traps; and a parser which converts the filter elements in the forwarding file into data structures which incorporate matching values derived from the filter elements.

21. Apparatus according to claim 20 further comprising a comparator which compares the variable values in the SNMP traps to the data structure matching values to select one of the records for forwarding the SNMP traps to the at least one destination.

22. Apparatus according to claim 20 wherein the modifying mechanism comprises a process for modifying the mapping file records to include wildcard elements which match a plurality of variable values in the SNMP traps.

23. Apparatus according to claim 22 wherein the parser comprises a converter which converts each wildcard element to a data structure limit which has an extreme value.

* * * * *